United States Patent
Iwama

(10) Patent No.: US 8,205,323 B2
(45) Date of Patent: Jun. 26, 2012

(54) METHOD OF MANUFACTURING HEAD GIMBAL ASSEMBLY

(75) Inventor: Hitoshi Iwama, Hong Kong (CN)

(73) Assignee: TDK Corporation, Tokyo (JP)

(*) Notice: Subject to any disclaimer, the term of this patent is extended or adjusted under 35 U.S.C. 154(b) by 317 days.

(21) Appl. No.: 12/654,511

(22) Filed: Dec. 22, 2009

(65) Prior Publication Data

US 2011/0146059 A1    Jun. 23, 2011

(51) Int. Cl.
*G11B 5/127* (2006.01)
*H04R 31/00* (2006.01)

(52) U.S. Cl. .......... 29/603.04; 29/603.03; 29/603.06; 29/603.07; 360/234.5; 360/245.8

(58) Field of Classification Search .......... 29/603.03, 29/603.04, 603.06, 603.07, 603.12, 603.2, 29/603.25; 360/234.5, 245.8
See application file for complete search history.

(56) References Cited

U.S. PATENT DOCUMENTS

| 5,828,031 A | 10/1998 | Pattanaik |
| 6,321,974 B1 | 11/2001 | Tsuchiya et al. |
| 7,739,785 B2 * | 6/2010 | Watanabe et al. .......... 29/603.06 |
| 2006/0139809 A1 | 6/2006 | Matsumoto et al. |

FOREIGN PATENT DOCUMENTS

| JP | A-10-261664 | 9/1998 |
| JP | A-2007-012169 | 1/2007 |

* cited by examiner

*Primary Examiner* — Paul D Kim
(74) *Attorney, Agent, or Firm* — Oliff & Berridge, PLC

(57) ABSTRACT

In a manufacturing method for a head gimbal assembly, before mounting a slider on a suspension, coating films each made of solder are formed on respective terminals of a plurality of leads to be connected to a plurality of electrode pads of the slider. After mounting the slider on the suspension, the coating films are heated with laser light to thereby melt the solder, with the respective terminals of the plurality of leads in contact with the corresponding electrode pads via the respective coating films, whereby the terminals are electrically and physically connected to the electrode pads.

2 Claims, 8 Drawing Sheets

METHOD OF MANUFACTURING HEAD GIMBAL ASSEMBLY

BACKGROUND OF THE INVENTION

1. Field of the Invention

The present invention relates to a method of manufacturing a head gimbal assembly for use in a magnetic disk drive, the head gimbal assembly including a slider and a suspension that supports the slider.

2. Description of the Related Art

A magnetic disk drive incorporates a head gimbal assembly including a slider and a suspension that supports the slider. The slider incorporates a magnetic head element. The magnetic head element includes a magnetoresistive element (hereinafter referred to as MR element) for reading, and an induction-type electromagnetic transducer for writing.

The suspension is attached to a driving arm of an actuator intended for moving the slider in a direction across the tracks of a recording medium. The slider has a medium facing surface that faces a magnetic disk as the recording medium. The slider is held by the suspension and slightly flies over the surface of the recording medium by means of an airflow that passes between the medium facing surface and the recording medium.

The suspension has a plurality of leads for electrically connecting the magnetic head element in the slider to a control circuit that controls the magnetic head element. On the outer surface of the slider, there are provided a plurality of electrode pads that are electrically connected to the magnetic head element. Each of the plurality of leads includes a slender lead body and a terminal. The terminal is provided at one end of the lead body and is electrically and physically connected to a corresponding electrode pad. The other end of the lead body is electrically connected to the control circuit.

Conventional methods for electrically and physically connecting the electrode pads of the slider and the terminals of the leads to each other mainly include the following first and second methods. A first method is disclosed in, for example, U.S. Pat. No. 5,828,031 and U.S. Patent Application Publication No. 2006/0139809 A1. In the method, the electrode pads and the terminals are arranged orthogonal to each other with solder balls interposed therebetween. The solder balls are irradiated with a laser beam so that the solder balls melt to form solder fillets, whereby the electrode pads and the terminals are connected to each other.

A second method is disclosed in, for example, U.S. Pat. No. 6,321,974 B1. In the method, the terminals of the leads are pressed against the electrode pads of the slider and ultrasonic vibrations are applied to the terminals by the top part of an ultrasonic vibrator, whereby the electrode pads and the terminals are ultrasonic-bonded to each other.

JP-A-2007-12169 describes a method of fixing the slider to the suspension such that the slider is easily detachable from the suspension for the purpose of conducting a test to evaluate the flying characteristics of the slider and the characteristics of the magnetic head element. In this method, the terminals of the leads have spring characteristics. The slider is positioned by a stopper that is disposed on a side opposite to the terminals of the leads, and the terminals of the leads are pressed against terminals of the slider. This electrically connects the terminals of the leads and the terminals of the slider to each other, and fixes the slider to the suspension. JP-A-2007-12169 describes that if the test result is satisfactory, conductor balls of solder or gold are interposed between the terminals of the leads and the terminals of the slider, and the conductor balls are then melted by irradiation with laser light, whereby the terminals of the leads and the terminals of the slider are electrically and physically connected to each other.

With the recent miniaturization of sliders, the electrode pads of the sliders have become accordingly smaller in size and in spacing. For improved performance of magnetic disk drives, not only the MR element and the induction-type electromagnetic transducer but also one or more other elements may in the future be provided in a slider. Examples of such other elements include a heater for controlling the distance between the medium facing surface and the recording medium, a temperature sensor, and a laser diode for use in heat-assisted magnetic recording. The increase of elements provided in a slider entails an increase in the number of electrode pads of the slider. This makes the electrode pads of the slider even smaller in size and in spacing.

If the electrode pads of the slider are small in size and in spacing as mentioned above, the conventional methods for electrically and physically connecting the electrode pads of the slider and the terminals of the leads to each other have the following problems.

The first conventional method requires solder balls of considerable size in order to allow the formation of the solder fillets. Therefore, according to this method, the melted solder can widely flow out from between the electrode pads and the terminals, so that adjoining electrode pads and adjoining terminals may be electrically connected to each other by the solder. The first method thus has the problem of poor reliability of connection between a plurality of pairs of electrode pads and terminals.

With the second conventional method, it is difficult to bond a plurality of pairs of electrode pads and terminals uniformly if a large-sized ultrasonic vibrator is used to ultrasonic-bond the plurality of pairs of electrode pads and terminals at the same time. The second method therefore has the problem of poor reliability of connection between a plurality of pairs of electrode pads and terminals. The second method also has a problem in that the ultrasonic vibrator is difficult to miniaturize in line with the miniaturization of the electrode pads.

OBJECT AND SUMMARY OF THE INVENTION

An object of the present invention is to provide a manufacturing method for a head gimbal assembly, the method allowing electrical and physical connection between a plurality of pairs of slider electrode pads and lead terminals with high reliability even if the slider electrode pads are small in size and in spacing.

A head gimbal assembly to be manufactured by a manufacturing method of the present invention includes a suspension, and a slider that is mounted on the suspension. The slider has an outer surface, and a plurality of electrode pads located on the outer surface. The suspension has a plurality of leads that respectively correspond to the plurality of electrode pads. The plurality of leads include respective terminals that are electrically and physically connected to the corresponding electrode pads.

The manufacturing method for the head gimbal assembly of the present invention includes the steps of forming coating films respectively on the terminals of the plurality of leads, each of the coating films being made of solder;

mounting the slider on the suspension so that the respective terminals of the plurality of leads come in contact with the corresponding electrode pads via the respective coating films, the step of mounting being performed after the step of forming the coating films; and heating the coating films with light and thereby melting the solder so that the respective terminals of the plurality of leads are electrically and physically connected to the corresponding electrode pads by the solder.

In the manufacturing method for the head gimbal assembly of the present invention, the light used to heat the coating films may be laser light.

In the manufacturing method for the head gimbal assembly of the present invention, the terminals may have such a shape that their respective tip parts approach the electrode pads when subjected to no external force. Here, in the step of mounting the slider on the suspension, the slider may be mounted on the suspension with the terminals elastically deformed away from the electrode pads by a jig, and then the elastic deformation of the terminals caused by the jig may be released so that the terminals are pressed against the electrode pads by the terminals' own elasticity.

In the manufacturing method for the head gimbal assembly of the present invention, the coating films may each have a thickness in the range of 25 to 50 μm.

In the manufacturing method for the head gimbal assembly of the present invention, the outer surface of the slider may include a first electrode pad locating surface and a second electrode pad locating surface that are at different levels. At least one of the plurality of electrode pads may be located on the first electrode pad locating surface. At least another one of the plurality of electrode pads may be located on the second electrode pad locating surface.

According to the manufacturing method for the head gimbal assembly of the present invention, coating films each made of solder are respectively formed on the terminals of the plurality of leads before mounting the slider on the suspension. After mounting the slider on the suspension, the coating films are heated with light to melt the solder, with the respective terminals of the plurality of leads in contact with the corresponding electrode pads via the respective coating films. The respective terminals of the plurality of leads are thus electrically and physically connected to the corresponding electrode pads by the solder. According to the present invention, it is possible to prevent the solder from widely flowing out from between the electrode pads and the terminals. Consequently, the present invention makes it possible to electrically and physically connect a plurality of pairs of slider electrode pads and lead terminals with high reliability even if the slider electrode pads are small in size and in spacing.

Other and further objects, features and advantages of the present invention will appear more fully from the following description.

DETAILED DESCRIPTION OF THE PREFERRED EMBODIMENTS

[First Embodiment]

Figure 4:
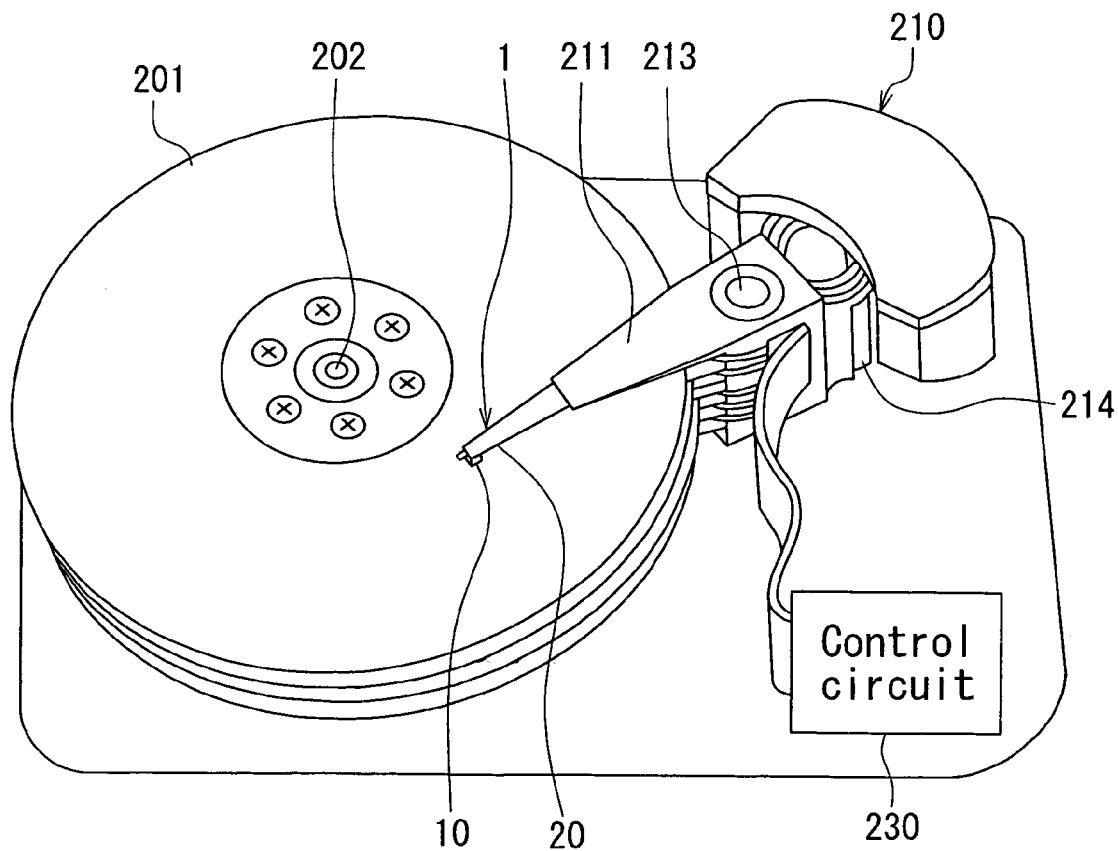
FIG. 4 is a perspective view of a magnetic disk drive that includes the head gimbal assembly according to the first embodiment of the invention.

Preferred embodiments of the present invention will now be described in detail with reference to the drawings. Reference is first made to FIG. 4 to describe a magnetic disk drive that includes a head gimbal assembly according to a first embodiment of the invention. The magnetic disk drive shown in FIG. 4 includes a plurality of magnetic disks 201 as a plurality of magnetic recording media, and a spindle motor 202 for rotating the plurality of magnetic disks 201. The magnetic disks 201 are for use in perpendicular magnetic recording, for example. Each magnetic disk 201 has such a structure that a soft magnetic backing layer, a middle layer and a magnetic recording layer (perpendicular magnetization layer) are stacked in this order on a disk substrate.

The magnetic disk drive further includes an assembly carriage device 210, and a plurality of head gimbal assemblies 1 according to the present embodiment. The assembly carriage device 210 has a plurality of driving arms 211, and the head gimbal assemblies 1 are attached to respective tip parts of the driving arms 211. Each head gimbal assembly 1 includes a suspension 20, and a slider 10 mounted on the suspension 20. The slider 10 includes a magnetic head element. The magnetic head element includes an MR element for reading and an induction-type electromagnetic transducer for writing.

The assembly carriage device 210 is a device for positioning the slider 10 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic disk drive further includes a control circuit 230 for controlling the magnetic head element in the slider 10.

The magnetic disk drive including the head gimbal assembly 1 according to the present embodiment is not structurally limited to the one having the above-described configuration. For example, the magnetic disk drive may be provided with a single magnetic disk 201, a single driving arm 211 and a single head gimbal assembly 1.

Figure 1:
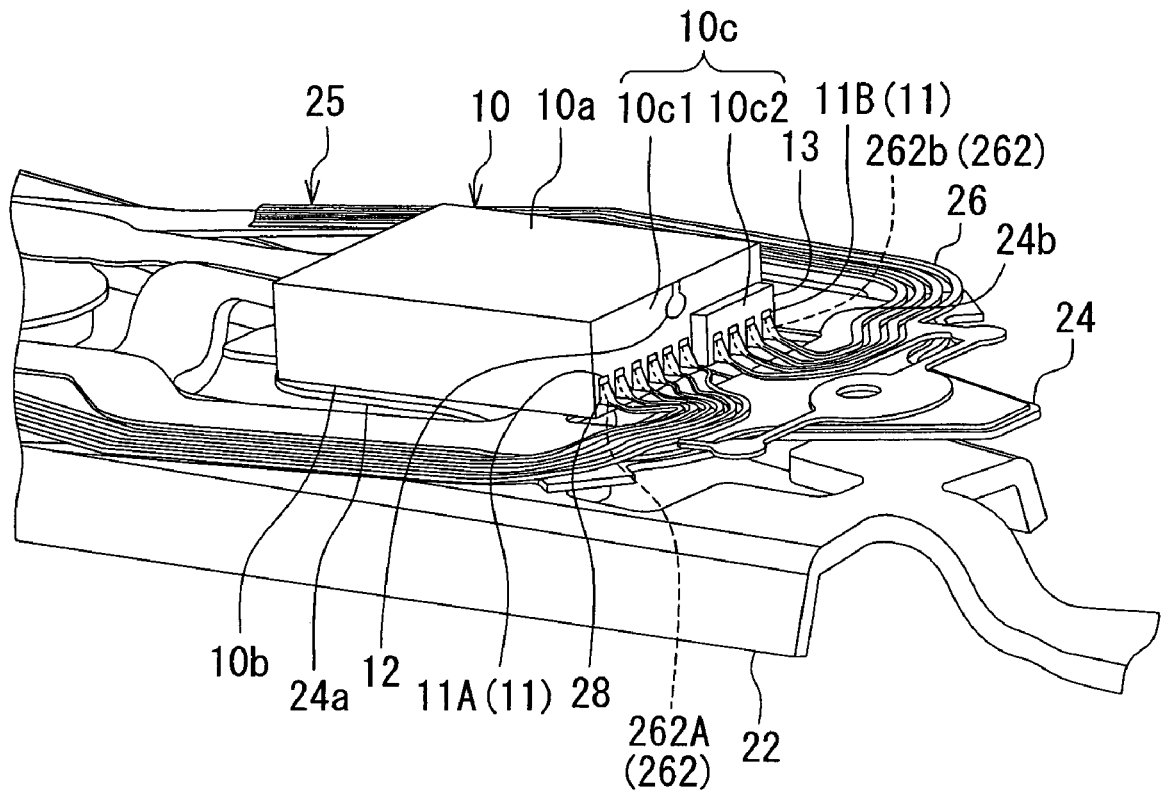
FIG. 1 is a perspective view showing the main part of a head gimbal assembly according to a first embodiment of the invention.
Figure 2:
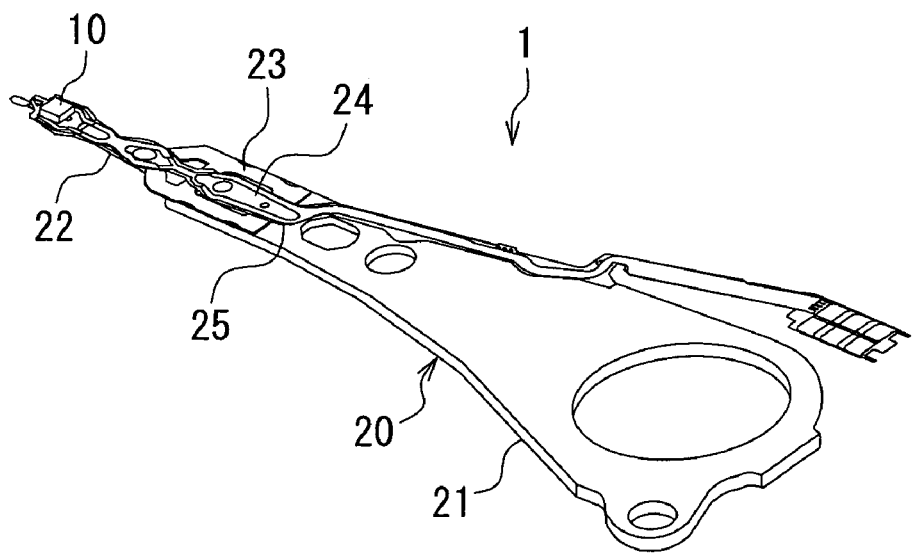
FIG. 2 is a perspective view of the head gimbal assembly according to the first embodiment of the invention.
Figure 3:
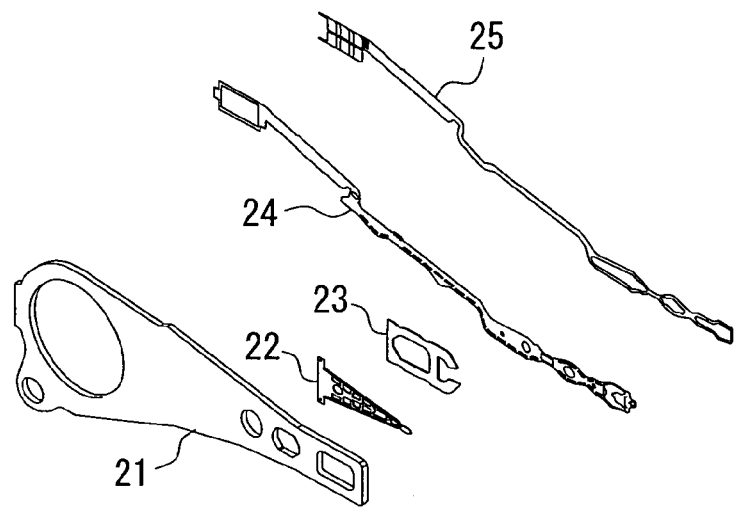
FIG. 3 is an exploded perspective view of the suspension of the head gimbal assembly according to the first embodiment of the invention.

Now, a description will be given of the head gimbal assembly 1 according to the present embodiment with reference to FIG. 1 to FIG. 3. FIG. 1 is a perspective view showing the main part of the head gimbal assembly 1. FIG. 2 is a perspective view of the head gimbal assembly 1. FIG. 3 is an exploded perspective view of the suspension 20 of the head gimbal assembly 1.

As previously described, the head gimbal assembly 1 includes the suspension 20, and the slider 10 mounted on the suspension 20. As shown in FIG. 2 and FIG. 3, the suspension 20 includes a mount base 21, a load beam 22, a hinge 23, a flexure 24, and a wiring member 25.

The mount base 21 has such a shape as to decrease in width from its base part to its tip part. The base part of the mount base 21 is attached to the tip part of the driving arm 211 shown in FIG. 4. The load beam 22 has such a shape as to decrease in width from its base part to its tip part. The hinge 23 has elasticity and connects the mount base 21 and the load beam 22 to each other. The flexure 24 is shaped to be long in one direction and has elasticity. The flexure 24 is fixed to the load beam 22 and the hinge 23. The wiring member 25 is fixed to the flexure 24.

As shown in FIG. 1, the flexure 24 has a plate-shaped gimbal section 24a having flexibility. The gimbal section 24a has a first surface that faces the load beam 22, and a second surface opposite to the first surface. The slider 10 is fixed to the second surface of the gimbal section 24a. The load beam 22 has a protrusion that comes in contact with the first surface of the gimbal section 24a.

As shown in FIG. 1, the slider 10 is nearly hexahedron-shaped. The slider 10 has an outer surface, and a plurality of electrode pads 11 located on the outer surface. More specifically, the outer surface of the slider 10 includes: a medium facing surface 10a that faces the magnetic disk 201; a rear surface 10b opposite to the medium facing surface 10a; and four side surfaces that connect the medium facing surface 10a to the rear surface 10b. The rear surface 10b is bonded to the second surface of the gimbal section 24a. The plurality of electrode pads 11 are located on a side surface 10c of the slider 10, which is one of the four side surfaces of the slider 10. FIG. 1 shows an example where ten electrode pads 11 are located on the side surface 10c. The number of the electrode pads 11 of the present embodiment is not limited to ten, however, and can be any plural number.

The slider 10 includes the magnetic head element 12 disposed near the medium facing surface 10a. The magnetic head element 12 includes an MR element for reading and an induction-type electromagnetic transducer for writing. The magnetic head element 12 may further include one or more other elements in addition to the MR element and the induction-type electromagnetic transducer. Examples of such other elements include a heater for controlling the distance between the medium facing surface 10a and the magnetic disk 201, and a temperature sensor.

In the present embodiment, the magnetic head element 12 further includes a near-field light generating element and a waveguide that are used for heat-assisted magnetic recording. The near-field light generating element is a small piece of metal, and generates near-field light for heating a part of the magnetic recording layer of the magnetic disk 201 based on laser light that propagates through the waveguide. The slider 10 includes a laser diode 13 that supplies the laser light to the waveguide.

The side surface 10c of the slider includes a first electrode pad locating surface 10c1 and a second electrode pad locating surface 10c2 that are at different levels. The second electrode pad locating surface 10c2 protrudes outwardly relative to the first electrode pad locating surface 10c1. The second electrode pad locating surface 10c2 is formed by an outer surface of the laser diode 13. At least one of the plurality of electrode pads 11 is located on the first electrode pad locating surface 10c1. At least another one of the plurality of electrode pads 11 is located on the second electrode pad locating surface 10c2. In the example shown in FIG. 1, six electrode pads 11 are located on the first electrode pad locating surface 10c1. The six electrode pads 11 are electrically connected to the magnetic head element 12. In the example shown in FIG. 1, four electrode pads 11 are located on the second electrode pad locating surface 10c2. The four electrode pads 11 are electrically connected to the laser diode 13. Hereinafter, the six electrode pads 11 located on the first electrode pad locating surface 10c1 will be designated by the reference numeral 11A and the four electrode pads 11 located on the second electrode pad locating surface 10c2 will be designated by the reference numeral 11B when necessary.

The wiring member 25 has a plurality of leads 26 that respectively correspond to the plurality of electrode pads 11. In the example shown in FIG. 1, the wiring member 25 has ten leads 26. Each of the plurality of leads 26 includes a slender lead body 261 and a terminal 262. The terminal 262 is provided at one end of the lead body 261 and is electrically and physically connected to a corresponding electrode pad 11. The terminal 262 is formed by, for example, bending a slender strip of conductor in the vicinity of its extremity. The part of the slender strip of conductor from its extremity to the position where it is bent makes the terminal 262, and the rest of the strip makes the lead body 261. The respective terminals 262 of the plurality of leads 26 are electrically and physically connected to the corresponding electrode pads 11 by solder 28.

Hereinafter, six terminals 262 connected to the six electrode pads 11A will be designated by the reference numeral 262A and four terminals 262 connected to the four electrode pads 11B will be designated by the reference numeral 262B when necessary. Corresponding to the positional relationship between the electrode pad locating surfaces 10c1 and 10c2, the six terminals 262A and the four terminals 262B are offset from each other in a direction perpendicular to the electrode pad locating surfaces 10c1 and 10c2.

As shown in FIG. 1, the flexure 24 has a hole 24b formed near the plurality of terminals 262. The load beam 22 has a hole 22a formed at a position corresponding to the hole 24b of the flexure 24. The holes 22a and 24b are to be used in the manufacturing method for the head gimbal assembly 1 described below.

Figure 5:
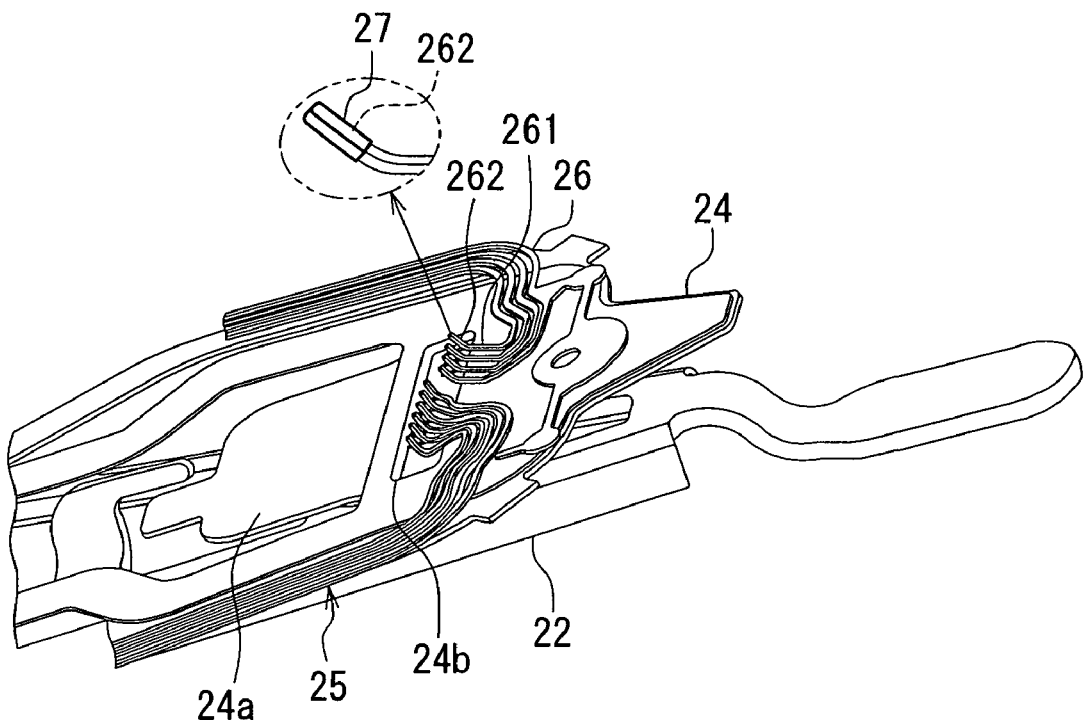
FIG. 5 is a perspective view showing the main part of the suspension of the head gimbal assembly according to the first embodiment of the invention.

The manufacturing method for the head gimbal assembly 1 according to the present embodiment will now be described. In the manufacturing method for the head gimbal assembly 1, first, the slider 10 is fabricated and also the components of the suspension 20 shown in FIG. 3, namely, the mount base 21, the load beam 22, the hinge 23, the flexure 24, and the wiring member 25 are fabricated. In the present embodiment, prior to the fabrication of the suspension 20 from the plurality of components of the suspension 20 shown in FIG. 3, coating films each made of solder are formed respectively on the terminals 262 of the plurality of leads 26 of the wiring member 25. The mount base 21, the load beam 22, the hinge 23, the flexure 24, and the wiring member 25 are then assembled into the suspension 20. FIG. 5 shows the vicinity of the terminals 262 of the leads 26 of the suspension 20 thus fabricated. In FIG. 5, the reference numeral 27 indicates the coating film formed on each terminal 262. The coating film 27 is formed by electroplating, for example. The coating film 27 is made of Pb-free solder, for example.

Figure 6:
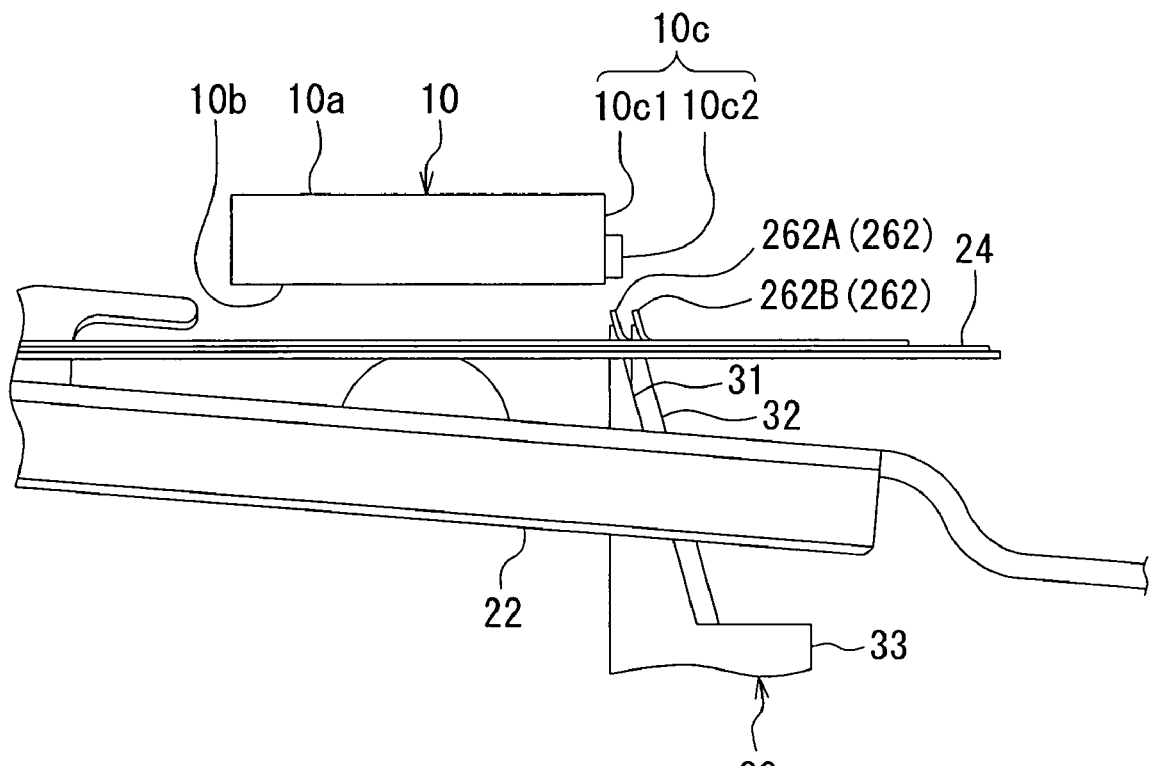
FIG. 6 is an explanatory diagram showing a step of a manufacturing method for the head gimbal assembly according to the first embodiment of the invention.
Figure 7:
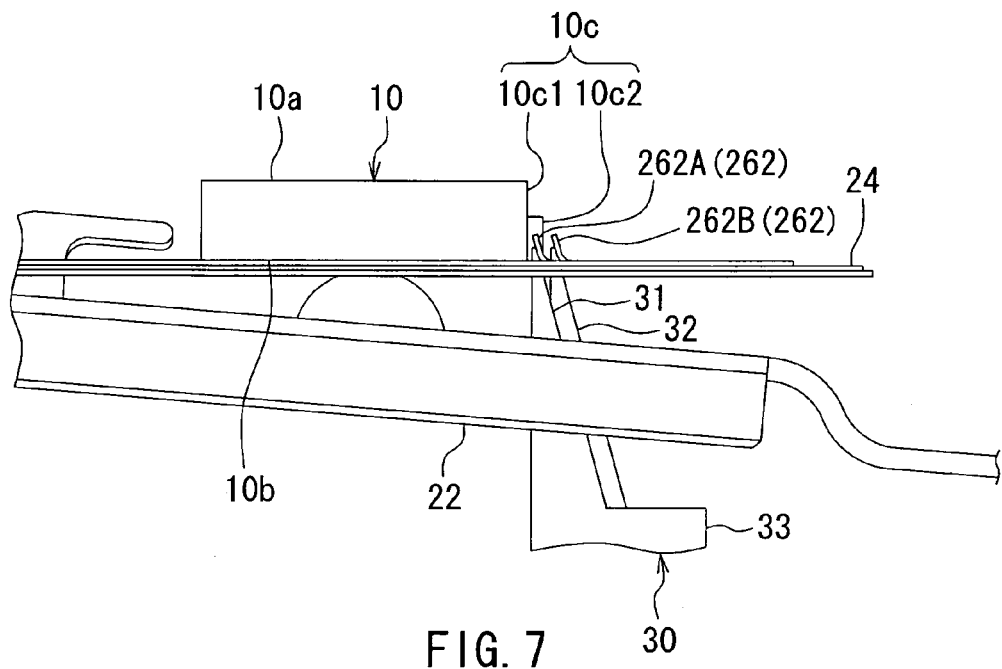
FIG. 7 is an explanatory diagram showing a step that follows the step of FIG. 6.
Figure 8:
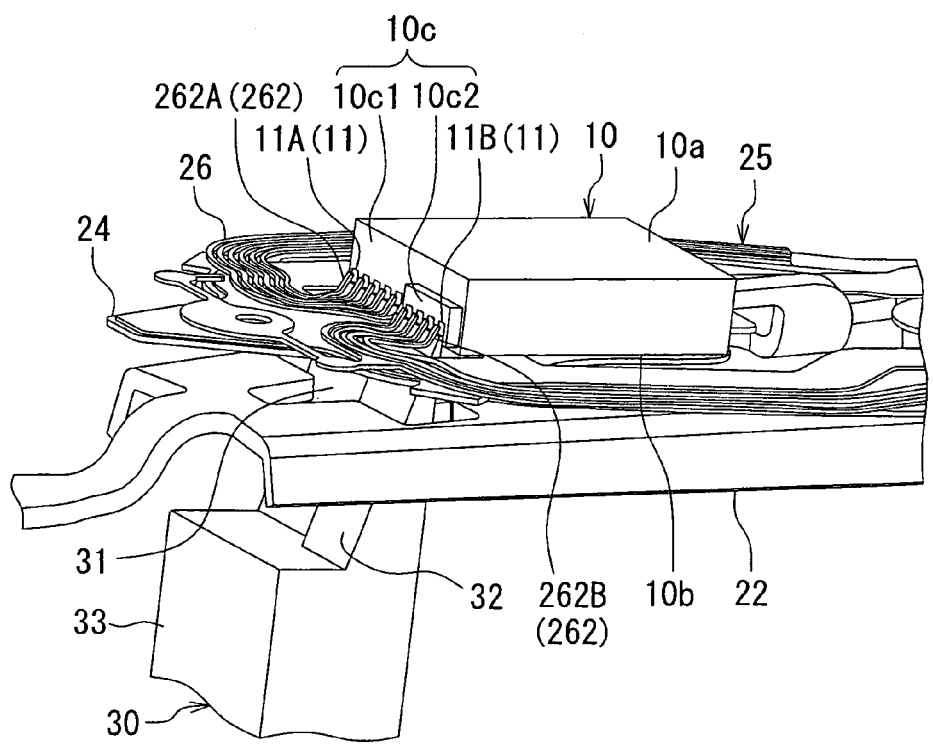
FIG. 8 is an explanatory diagram showing the step of FIG. 7.

In the manufacturing method for the head gimbal assembly 1, the slider 10 is then mounted on the suspension 20 so that the respective terminals 262 of the plurality of leads 26 come in contact with the corresponding electrode pads 11 via the respective coating films 27. Specifically, the slider 10 is arranged so that the rear surface 10b comes in contact with the second surface of the gimbal section 24a, and is fixed to the gimbal section 24a with an adhesive, for example. FIG. 6 shows the state immediately before the slider 10 is mounted on the suspension 20. FIG. 7 and FIG. 8 show the state immediately after the slider 10 is mounted on the suspension 20.

The terminals 262 have such a shape that their respective tip parts approach the electrode pads 11 when subjected to no external force. The terminals 262 have elasticity and are capable of elastic deformation so as to change the distance to the electrode pads 11 before physically connected to the electrode pads 11.

In the step of mounting the slider 10 on the suspension 20, as shown in FIG. 6 to FIG. 8, the slider 10 is initially mounted on the suspension 20 with the terminals 262 elastically deformed away from the electrode pads 11 by a jig 30. The jig 30 has two wedge portions 31 and 32, and a support part 33 connected to the base parts of the wedge portions 31 and 32. The wedge portions 31 and 32 are inserted into the hole 22a of the load beam 22 and the hole 24b of the flexure 24 from the side of the hole 22a. The top of the wedge portion 31 comes into contact with the six terminals 262A and elastically deforms the six terminals 262A away from the six electrode pads 11A. The top of the wedge portion 32 comes into contact with the four terminals 262B and elastically deforms the four terminals 262B away from the four electrode pads 11B.

Figure 9:
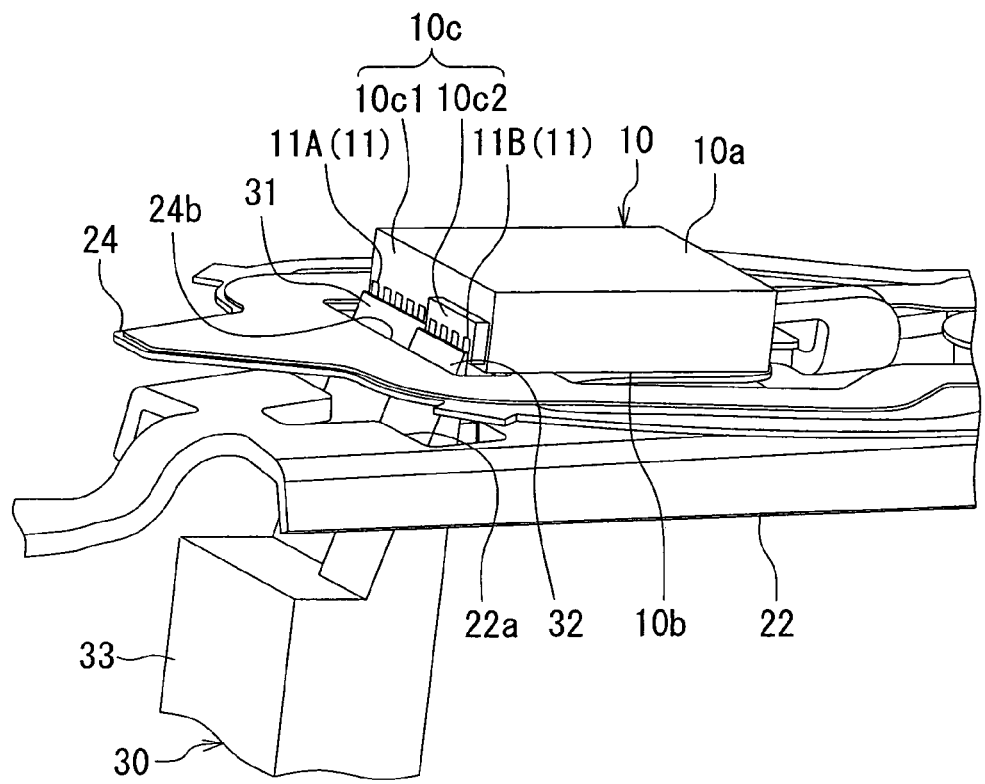
FIG. 9 is an explanatory diagram where a part of FIG. 8 is omitted.
Figure 10:
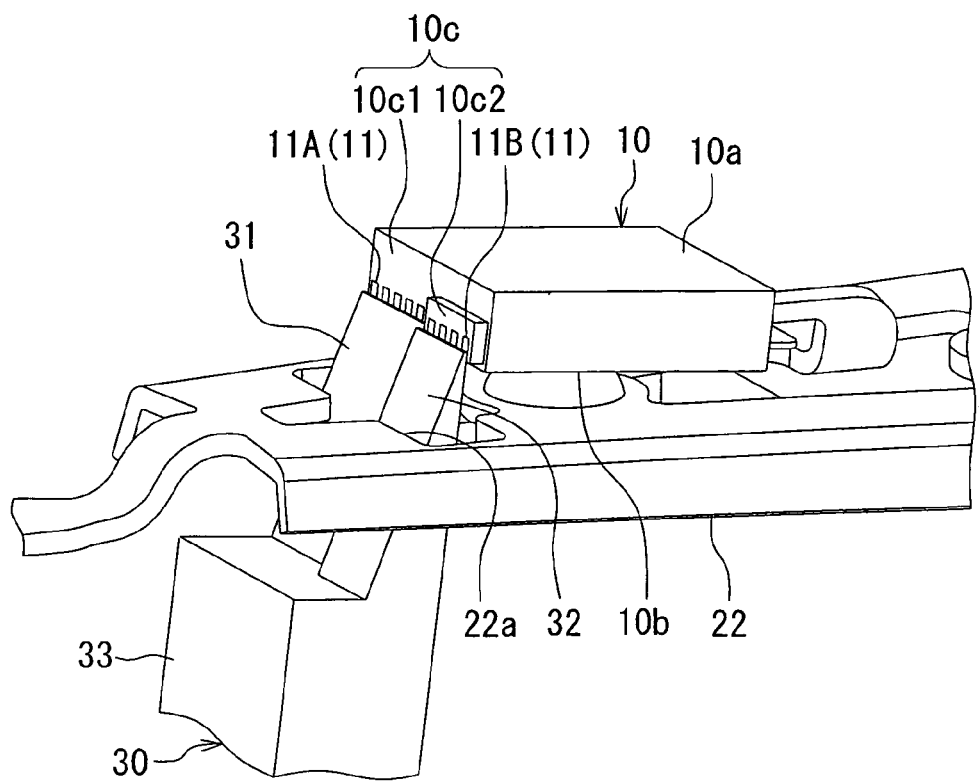
FIG. 10 is an explanatory diagram where a part of FIG. 9 is omitted.

FIG. 9 and FIG. 10 are diagrams for facilitating the understanding of the shape of the jig 30. FIG. 9 is a diagram where the wiring member 25 is omitted from FIG. 8. FIG. 10 is a diagram where the flexure 24 is omitted from FIG. 9.

Figure 11:
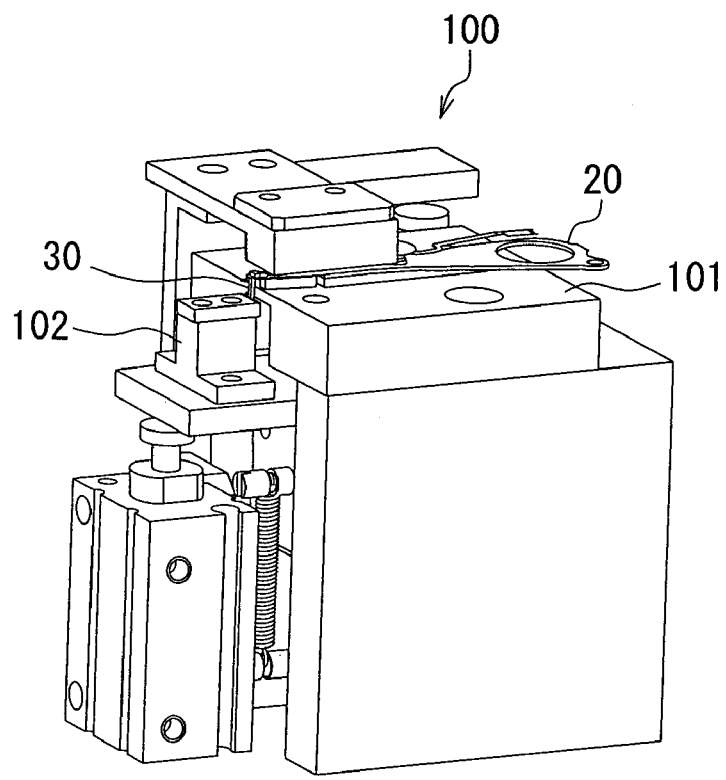
FIG. 11 is a perspective view of a suspension supporting device for use in the manufacturing method for the head gimbal assembly according to the first embodiment of the invention.

FIG. 11 is a perspective view showing a suspension supporting device 100 for use in the manufacturing method for the head gimbal assembly 1 according to the present embodiment. The suspension supporting device 100 includes a stage 101 which holds the suspension 20, and a jig holding part 102 which holds the jig 30 for horizontal and vertical movements. The step of mounting the slider 10 on the suspension 20 is performed by using the suspension supporting device 100 shown in FIG. 11, for example. With the suspension 20 held by the stage 101, the jig 30 is moved by the jig holding part 102, so that the jig 30 elastically deforms the plurality of terminals 262 away from the plurality of electrode pads 11 as shown in FIG. 6 to FIG. 8. In such a state, the slider 10 is mounted on the suspension 20.

Figure 12:
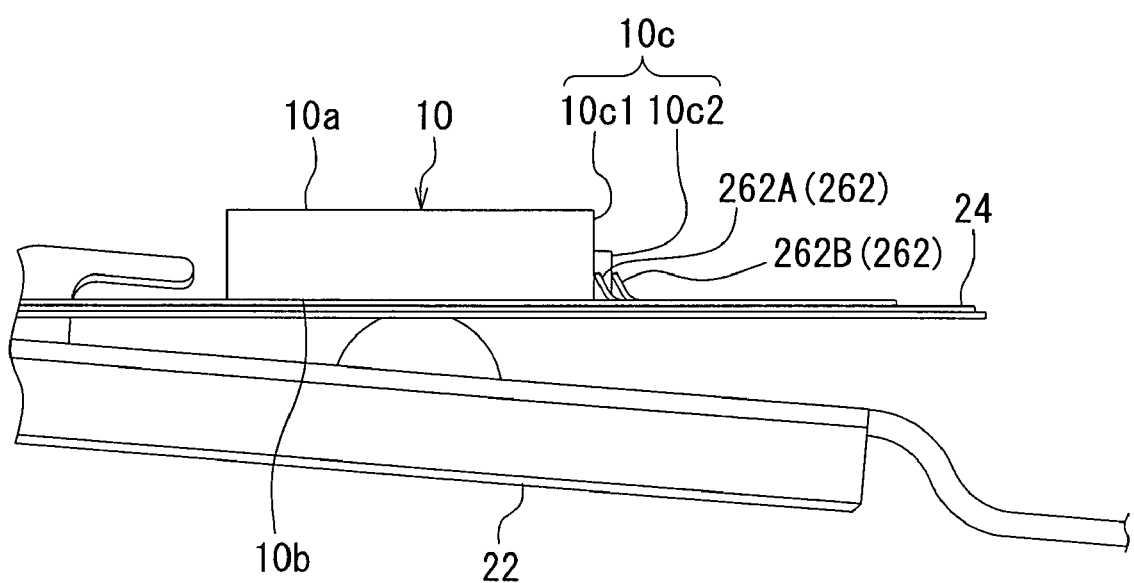
FIG. 12 is an explanatory diagram showing a step that follows the step of FIG. 7.

FIG. 12 is an explanatory diagram showing a step that follows the step of FIG. 7. In this step, the elastic deformation of the terminals 262 caused by the jig 30 is released so that the terminals 262 are pressed against the electrode pads 11 by the terminals' own elasticity. The series of steps that have been described with reference to FIG. 6 to FIG. 12 correspond to the step of mounting the slider on the suspension according to the present invention.

In the manufacturing method for the head gimbal assembly 1, the coating films 27 made of solder are then heated with light to thereby melt the solder so that the respective terminals 262 of the plurality of leads 26 are electrically and physically connected to the corresponding electrode pads 11 by the solder. An example of the light used to heat the coating films 27 is laser light. The laser light preferably is infrared light which is suited for heating. Examples of the laser for emitting the laser light include a YAG laser that emits laser light of 1063 nm in wavelength and a laser diode that emits laser light of 810 nm in wavelength. A thermal energy of approximately 30 to 50 mJ is required for melting the solder constituting the coating film 27 formed on a terminal 262.

Figure 13:
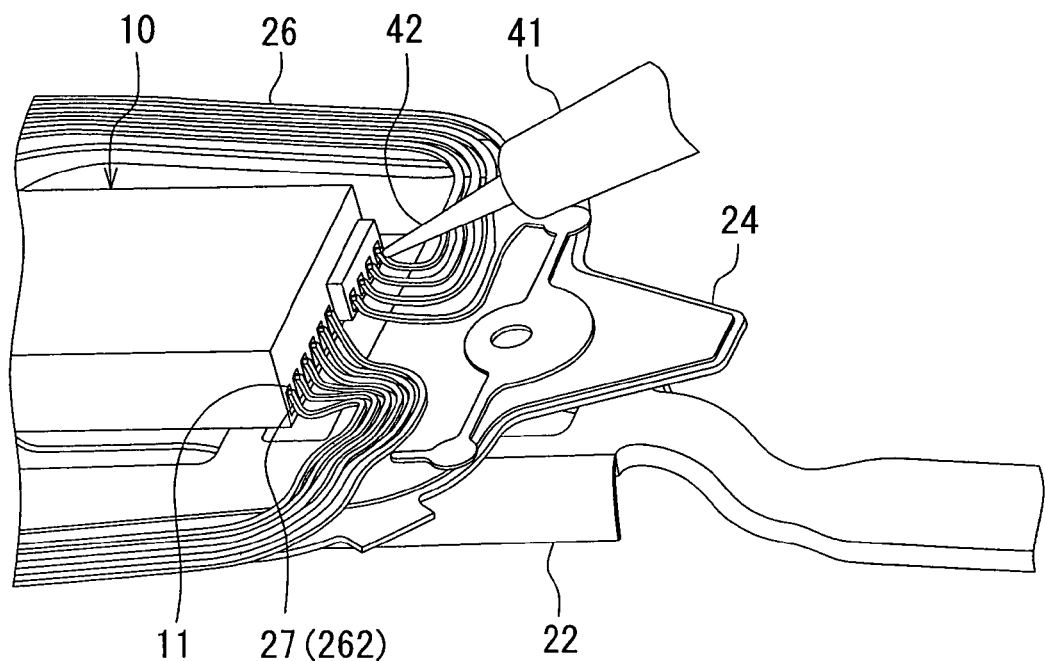
FIG. 13 is an explanatory diagram showing an example of a step that follows the step of FIG. 12.

FIG. 13 shows an example of the step of heating the coating films 27 with laser light and thereby melting the solder. In this example, laser light emitted from a not-shown laser is passed through a lens 41, whereby the laser light is converted into a converging laser light beam 42. The respective coating films 27 on the plurality of terminals 262 are then irradiated with the laser light beam 42 in succession for a predetermined time each.

Figure 14:
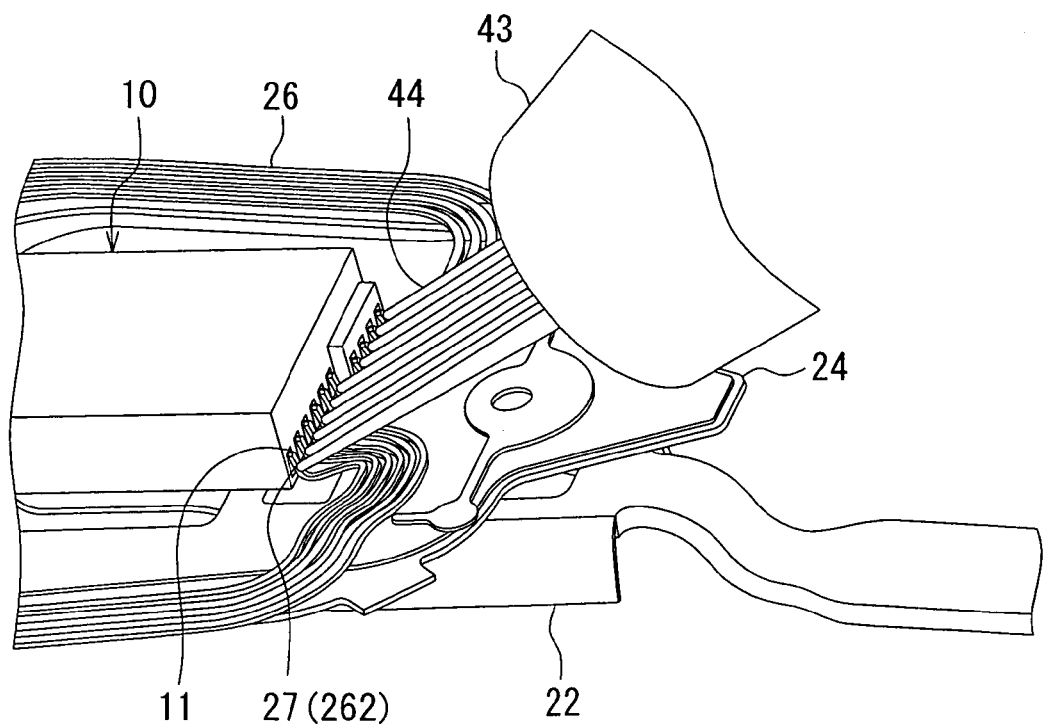
FIG. 14 is an explanatory diagram showing another example of the step that follows the step of FIG. 12.

FIG. 14 shows another example of the step of heating the coating films 27 with laser light and thereby melting the solder. In this example, laser light emitted from a not-shown laser is passed through an optical system 43, whereby the laser light is converted into a plurality of laser light beams 44 each converging. The respective coating films 27 on the plurality of terminals 262 are then simultaneously irradiated with the laser light beams 44 for a predetermined time.

In both of the examples shown in FIG. 13 and FIG. 14, the coating films 27 are heated by the irradiating laser light beam(s) and the solder constituting the coating films 27 is thereby melted. When the irradiation with the laser light beam(s) is ended and the melted solder solidifies, the terminals 262 are electrically and physically connected to the electrode pads 11 by the solder 28 as shown in FIG. 1.

As has been described, in the manufacturing method for the head gimbal assembly 1 according to the present embodiment, the coating films 27 each made of solder are formed respectively on the terminals 262 of the plurality of leads 26 before mounting the slider 10 on the suspension 20. After mounting of the slider 10 on the suspension 20, the coating films 27 are heated with light to melt the solder, with the respective terminals 262 of the plurality of leads 26 in contact with the corresponding electrode pads 11 via the respective coating films 27. The respective terminals 262 of the plurality of leads 26 are thus electrically and physically connected to the corresponding electrode pads 11 by the solder.

One of the conventional methods for connecting the electrode pads of the slider and the terminals of the leads to each other is to interpose solder balls between the electrode pads and the terminals which are arranged orthogonal to each other, and then to irradiate the solder balls with a laser beam so that the solder balls melt to form solder fillets, which connect the electrode pads and the terminals to each other. Such a method requires solder balls of considerable size in order to allow the formation of the solder fillets. With this method, the melted solder can therefore widely flow out from between the electrode pads and the terminals, so that adjoining electrode pads and adjoining terminals may be electrically connected to each other by the solder.

In the present embodiment, in contrast, the solder constituting the coating films 27 formed on the terminals 262 is melted, so that the terminals 262 are electrically and physically connected to the electrode pads 11 by this solder. Since the present embodiment does not involve the formation of voluminous solder fillets, the coating films 27 require only a smaller volume of solder than that of the solder balls used in the foregoing conventional method. In the present embodiment, the terminals 262 are put in contact with the electrode pads 11 via the coating films 27 before the coating films 27 are melted. Melting the solder constituting the coating films 27 to connect the terminals 262 to the electrode pads 11 therefore does not require so long heating time (laser light irradiation time) that the solder widely flows out from between the electrode pads 11 and the terminals 262. Consequently, according to the present embodiment, it is possible to prevent the solder from widely flowing out from between the electrode pads 11 and the terminals 262. According to the present embodiment, it is therefore possible to electrically and physically connect a plurality of pairs of electrode pads 11 and terminals 262 with high reliability even if the electrode pads 11 are small in size and in spacing.

In the present embodiment, the terminals 262 have such a shape that their respective tip parts approach the electrode pads 11 when subjected to no external force. In the step of mounting the slider 10 on the suspension 20, the slider 10 is mounted on the suspension 20 with the terminals 262 elastically deformed away from the electrode pads 11 by the jig 30, and then the elastic deformation of the terminals 262 caused by the jig 30 is released so that the terminals 262 are pressed against the electrode pads 11 by the terminals' own elasticity. According to the present embodiment, it is thus possible to put the terminals 262 into contact with the electrode pads 11 via the coating films 27 with reliability before the coating films 27 are heated with light to melt the solder. This makes it possible to electrically and physically connect the electrode pads 11 and the terminals 262 to each other with higher reliability.

In the present embodiment, as described above, the terminals 262 are pressed against the electrode pads 11 by the terminals' own elasticity before the coating films 27 are heated with light to melt the solder. It is therefore possible to put all of the terminals 262 into contact with the corresponding electrode pads 11 via the coating films 27 with reliability even if one or more of the terminals 262 are located somewhat off the desired positions. Consequently, according to the present embodiment, it is possible to electrically and physically connect the electrode pads 11 and the terminals 262 to each other with high reliability.

In the present embodiment, the side surface 10c of the slider includes the first electrode pad locating surface 10c1 and the second electrode pad locating surface 10c2 that are at different levels. Six electrode pads 11A are located on the first electrode pad locating surface 10c1. Four electrode pads 11B are located on the second electrode pad locating surface 10c2. Six terminals 262A are connected to the six electrode pads 11A. Four terminals 262B are connected to the four electrode pads 11B. Corresponding to the positional relationship between the electrode pad locating surfaces 10c1 and 10c2, the six terminals 262A and the four terminals 262B are offset from each other in a direction perpendicular to the electrode pad locating surfaces 10c1 and 10c2. In the present embodiment, as described above, the terminals 262 are pressed against the electrode pads 11 by the terminals' own elasticity before the coating films 27 are heated with light to melt the solder. This makes it possible to put all of the terminals 262 into contact with the corresponding electrode pads 11 via the coating films 27 with reliability even if the plurality of electrode pads 11 are divided into groups and located separately on the electrode pad locating surfaces 10c1 and 10c2 that are at different levels and one or more of the terminals 262 are located somewhat off the desired positions. Consequently, the present embodiment makes it possible to electrically and physically connect the electrode pads 11 and the terminals 262 to each other with high reliability even if the plurality of electrode pads 11 are divided into groups and located separately on the electrode pad locating surfaces 10c1 and 10c2 that are at different levels.

In the present embodiment, the slider 10 is configured to include the laser diode 13 for use in heat-assisted magnetic recording. This configuration creates the first electrode pad locating surface 10c1 and the second electrode pad locating surface 10c2 at different levels. In the present invention, however, the first electrode pad locating surface 10c1 and the second electrode pad locating surface 10c2 at different levels may be created by other factors than the laser diode 13, regardless of whether or not the slider 10 supports heat-assisted magnetic recording and whether or not the slider 10 includes the laser diode 13. In any case, for the reasons described above, it is possible to electrically and physically connect the electrode pads 11 and the terminals 262 to each other with high reliability.

Now, a description will be given of an experiment that was performed to determine the preferred range of thickness of the coating films 27. For the experiment, a plurality of samples were initially fabricated by forming the coating films 27 on the terminals 262 of the leads 26. Specifically, the coating films 27 were formed into six thicknesses: 20 µm, 25 µm, 30 µm, 50 µm, 75 µm, and 100 µm. The number of the samples fabricated for each thickness was 10, that is, a total of 60 samples were fabricated.

The 60 samples were subjected to the experiment under the same condition. The coating films 27 were heated with laser light to melt the solder constituting the coating films 27, whereby the terminals 262 were electrically and physically connected to the electrode pads 11. The experiment used a YAG laser as the laser for emitting the laser light, with a laser output of 20 mJ. The laser light had a spot diameter of 0.12 mm at the position of the coating films 27. The irradiation time of the coating films 27 with the laser light was 150 msec.

The experiment included a sample-by-sample visual inspection and exfoliation test on the connections between the terminals 262 and the electrode pads 11. In the visual inspection, the connections between the terminals 262 and the electrode pads 11 were observed and the states thereof were classified into three types: A, B, and C. State A applies where the solder melts sufficiently with no outflow of the solder. State B applies where the solder melts insufficiently. State C applies where the solder flows out. By the Visual inspection, each of the six thicknesses of the coating films 27 was evaluated for the state of the connections between the terminals 262 and the electrode pads 11 under the following criteria. If eight or more out of the 10 samples were evaluated as state A, the pertinent thickness of the coating films 27 was also evaluated as state A. In other cases, either state B or state C, whichever was larger in the number of samples among the 10 samples, was taken as the evaluation on the pertinent thickness of the coating films 27. Table 1 shows the results of the visual inspection.

TABLE 1

| | Coating film thickness | | | | | |
|---|---|---|---|---|---|---|
| Sample | 20 µm | 25 µm | 30 µm | 50 µm | 75 µm | 100 µm |
| 1 | C | A | A | A | A | A |
| 2 | C | A | A | A | B | B |
| 3 | A | A | A | A | A | A |
| 4 | A | C | A | A | A | A |
| 5 | C | A | A | A | B | B |
| 6 | C | A | A | A | A | B |
| 7 | C | A | A | A | B | B |
| 8 | A | A | A | A | A | A |

TABLE 1-continued

| | Coating film thickness | | | | | |
|---|---|---|---|---|---|---|
| Sample | 20 μm | 25 μm | 30 μm | 50 μm | 75 μm | 100 μm |
| 9 | C | C | A | A | A | B |
| 10 | C | A | A | A | A | B |
| Evaluation | C | A | A | A | B | B |

In the exfoliation test, the force necessary to exfoliate the terminal 262 from the electrode pad 11 was determined by a pull-off method, and the result was defined as the adhesion. FIG. 2 shows the results of the exfoliation test. Aside from the adhesions, Table 2 also shows the average, standard deviation, maximum, and minimum values of the adhesions for each thickness of the coating films 27. The adhesions are in units of gf. A desirable adhesion is 10 gf or higher.

TABLE 2

| | Coating film thickness | | | | | |
|---|---|---|---|---|---|---|
| Sample | 20 μm | 25 μm | 30 μm | 50 μm | 75 μm | 100 μm |
| 1 | 5.0 | 10.0 | 11.0 | 12.0 | 13.0 | 14.0 |
| 2 | 5.5 | 11.0 | 12.0 | 12.5 | 14.5 | 13.5 |
| 3 | 4.0 | 8.5 | 13.5 | 13.0 | 13.5 | 15.0 |
| 4 | 3.5 | 12.0 | 10.5 | 12.5 | 15.5 | 13.5 |
| 5 | 5.0 | 11.5 | 11.0 | 16.0 | 15.0 | 20.0 |
| 6 | 2.5 | 12.0 | 12.0 | 12.5 | 13.0 | 18.0 |
| 7 | 6.0 | 12.0 | 15.0 | 13.0 | 18.0 | 16.5 |
| 8 | 7.5 | 13.0 | 13.5 | 17.5 | 15.0 | 17.0 |
| 9 | 3.5 | 10.5 | 11.5 | 13.5 | 17.5 | 13.0 |
| 10 | 5.0 | 9.5 | 10.5 | 14.0 | 16.0 | 14.0 |
| Average | 4.75 | 11.00 | 12.05 | 13.65 | 15.10 | 15.45 |
| Standard deviation | 1.44 | 1.37 | 1.50 | 1.76 | 1.73 | 2.33 |
| Maximum | 7.50 | 13.00 | 15.00 | 17.50 | 18.00 | 20.00 |
| Minimum | 2.50 | 8.50 | 10.50 | 12.00 | 13.00 | 13.00 |

Table 3 shows the results of evaluation of the state by the visual inspection for each thickness of the coating films 27, and the average, standard deviation, maximum, and minimum values of the adhesions obtained in the exfoliation test for each thickness of the coating films 27. As in Table 2, the adhesions shown in Table 3 are in units of gf.

TABLE 3

| | | Coating film thickness | | | | | |
|---|---|---|---|---|---|---|---|
| | | 20 μm | 25 μm | 30 μm | 50 μm | 75 μm | 100 μm |
| Visual inspection | | C | A | A | A | B | B |
| Exfoliation test | Average | 4.75 | 11.00 | 12.05 | 13.65 | 15.10 | 15.45 |
| | Standard deviation | 1.44 | 1.37 | 1.50 | 1.76 | 1.73 | 2.33 |
| | Maximum | 7.50 | 13.00 | 15.00 | 17.50 | 18.00 | 20.00 |
| | Minimum | 2.50 | 8.50 | 10.50 | 12.00 | 13.00 | 13.00 |

As shown in Table 3, the 25 μm, 30 μm, and 50 μm thicknesses of the coating films 27 were evaluated as state A in the visual inspection performed on each thickness of the coating films 27 and showed an average adhesion of 10 gf or higher in the exfoliation test performed on each thickness of the coating films 27. This demonstrates that the preferred range of thickness of the coating films 27 is from 25 μm to 50 μm inclusive.

[Second Embodiment]

Figure 15:
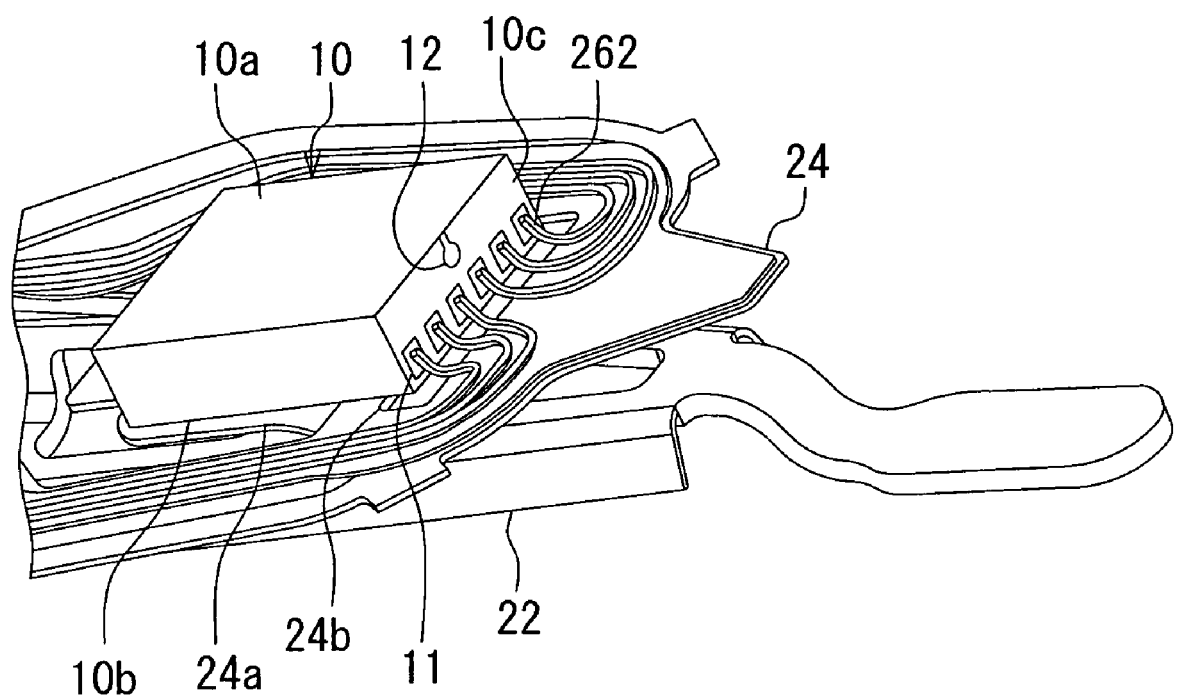
FIG. 15 is a perspective view showing the main part of a head gimbal assembly according to a second embodiment of the invention.

A second embodiment of the present invention will now be described with reference to FIG. 15. FIG. 15 is a perspective view showing the main part of the head gimbal assembly 1 according to the present embodiment. In the present embodiment, the side surface 10c of the slider 10 is a single flat surface, and six electrode pads 11 are located on this side surface 10c. In the present embodiment, the wiring member 25 has six leads 26 corresponding to the six electrode pads 11. The six leads 26 include respective terminals 262 that are electrically and physically connected to the corresponding electrode pads 11. In the present embodiment, the terminals 262 are electrically and physically connected to the electrode pads 11 by the same method as in the first embodiment. For ease of understanding of configuration, FIG. 15 depicts the electrode pads 11 and the terminals 262 with the solder omitted.

In the present embodiment, the side surface 10c of the slider 10 is a single flat surface and does not have the first electrode pad locating surface 10c1 and the second electrode pad locating surface 10c2 formed at different levels. In the present embodiment, the plurality of terminals 262 as designed are not offset from each other in a direction perpendicular to the side surface 10c. However, one or more of the terminals 262 may possibly be located somewhat off the desired positions. Even in such cases, according to the present embodiment, the terminals 262 are pressed against the electrode pads 11 by the terminals' own elasticity before the coating films 27 are heated with light to melt the solder as in the first embodiment. All of the terminals 262 can thus be put into contact with the corresponding electrode pads 11 via the coating films 27 with reliability.

The remainder of configuration, function and effects of the present embodiment are similar to those of the first embodiment.

The present invention is not limited to the foregoing embodiments, and various modifications may be made thereto. For example, in the present invention, the light used for heating the coating films is not limited to laser light, and may be any light that can heat the coating films.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A manufacturing method for a head gimbal assembly, the head gimbal assembly comprising a suspension, and a slider that is mounted on the suspension, wherein:

the slider has an outer surface, and a plurality of electrode pads located on the outer surface;

the suspension has a plurality of leads that respectively correspond to the plurality of electrode pads; and the plurality of leads include respective terminals that are electrically and physically connected to the corresponding electrode pads, the method comprising the steps of:

forming coating films respectively on the terminals of the plurality of leads, each of the coating films being made of solder;

mounting the slider on the suspension so that the respective terminals of the plurality of leads come in contact with the corresponding electrode pads via the respective coating films, the step of mounting being performed after the step of forming the coating films; and heating the coating films with light and thereby melting the solder so that the respective terminals of the plurality of leads are electrically and physically connected to the corresponding electrode pads by the solder, and wherein:

the terminals have such a shape that their respective tip parts approach the electrode pads when subjected to no external force; and in the step of mounting the slider on the suspension, the slider is mounted on the suspension with the terminals elastically deformed away from the electrode pads by a jig, and then the elastic deformation of the terminals caused by the jig is released so that the terminals are pressed against the electrode pads by the terminals' own elasticity.

2. A manufacturing method for a head gimbal assembly, the head gimbal assembly comprising a suspension, and a slider that is mounted on the suspension, wherein:

the slider has an outer surface, and a plurality of electrode pads located on the outer surface;

the suspension has a plurality of leads that respectively correspond to the plurality of electrode pads; and the plurality of leads include respective terminals that are electrically and physically connected to the corresponding electrode pads, the method comprising the steps of:

forming coating films respectively on the terminals of the plurality of leads, each of the coating films being made of solder;

mounting the slider on the suspension so that the respective terminals of the plurality of leads come in contact with the corresponding electrode pads via the respective coating films, the step of mounting being performed after the step of forming the coating films; and heating the coating films with light and thereby melting the solder so that the respective terminals of the plurality of leads are electrically and physically connected to the corresponding electrode pads by the solder, and wherein the outer surface of the slider includes a first electrode pad locating surface and a second electrode pad locating surface that are at different levels, and at least one of the plurality of electrode pads is located on the first electrode pad locating surface while at least another one of the plurality of electrode pads is located on the second electrode pad locating surface.

* * * * *